United States Patent
Damnjanovic et al.

(10) Patent No.: US 12,015,959 B2
(45) Date of Patent: Jun. 18, 2024

(54) MOBILITY ENHANCEMENTS: CHO EXECUTION CONDITION

(71) Applicant: QUALCOMM Incorporated, San Diego, CA (US)

(72) Inventors: Jelena Damnjanovic, Del Mar, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/643,535

(22) Filed: Dec. 9, 2021

(65) Prior Publication Data

US 2023/0189094 A1 Jun. 15, 2023

(51) Int. Cl.
*H04W 36/00* (2009.01)
*H04W 56/00* (2009.01)

(52) U.S. Cl.
CPC . *H04W 36/00837* (2018.08); *H04W 36/0058* (2018.08); *H04W 36/0072* (2013.01); *H04W 56/001* (2013.01)

(58) Field of Classification Search
None
See application file for complete search history.

(56) References Cited

U.S. PATENT DOCUMENTS

2020/0029251 A1* 1/2020 Wu .................. H04W 36/08
2020/0154326 A1 5/2020 Deenoo et al.
(Continued)

FOREIGN PATENT DOCUMENTS

EP 3968697 A1 * 3/2022
WO 2020119597 A1 6/2020
(Continued)

OTHER PUBLICATIONS

Ericsson: "Lower-Layer Mobility Enhancements", 3GPP Draft, 3GPP TSG-RAN WG1 Meeting #99, Tdoc R1-1912060, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, pp. 1-11, Nov. 8, 2019, XP051819934, Abstract p. 3, Observation 3, Sections 2, 2.1, 2.2, pp. 1-10, Chapter 2.1 L1-RSRP Reporting on Non-serving Cells, Figure 2.
(Continued)

*Primary Examiner* — Kenny S Lin
(74) *Attorney, Agent, or Firm* — Procopio, Cory, Hargreaves & Savitch LLP

(57) ABSTRACT

Methods, apparatuses, and computer-readable storage medium for conditional handover (CHO) are provided. An example method at a UE may include receiving, from a first base station, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements. The example method may further include detaching from a first cell associated with the first base station and synchronizing with a second cell associated with the second base station based on the one or more CHO measurements satisfying the one or more execution conditions, the second cell being one cell associated with the one or more CHO candidate cell configurations.

28 Claims, 9 Drawing Sheets

(56) References Cited

U.S. PATENT DOCUMENTS

| | | | |
|---|---|---|---|
| 2022/0030484 A1* | 1/2022 | Cheng | H04W 36/00837 |
| 2022/0110039 A1* | 4/2022 | Soldati | H04W 36/0085 |
| 2022/0124580 A1* | 4/2022 | Jeon | H04W 36/36 |
| 2022/0124590 A1* | 4/2022 | Da Silva | H04W 24/08 |
| 2022/0361052 A1* | 11/2022 | Pantelidou | H04W 36/0016 |
| 2023/0063931 A1* | 3/2023 | Damnjanovic | H04W 36/0058 |
| 2023/0078952 A1* | 3/2023 | Viering | H04W 24/10 |
| 2023/0139950 A1* | 5/2023 | Damnjanovic | H04W 36/0094 370/331 |
| 2023/0180065 A1* | 6/2023 | Da Silva | H04W 36/08 370/331 |

FOREIGN PATENT DOCUMENTS

| | | | | |
|---|---|---|---|---|
| WO | 2020157670 A1 | 8/2020 | | |
| WO | WO-2021118418 A1 * | 6/2021 | | H04W 36/0083 |
| WO | WO-2022188967 A1 * | 9/2022 | | |
| WO | WO-2023011851 A1 * | 2/2023 | | |

OTHER PUBLICATIONS

Ericsson: "TP : Update to Conditional Handover Requirements for NR", 3GPP TSG-RAN WG4 Meeting #94-e, R4- 2001416, 3rd Generation Partnership Project (3GPP) , Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020, 6 Pages, XP051851330, Chapter 6.1.1.6 NR FR1-NR FR1, Conditional Handover.

International Search Report and Written Opinion—PCT/US2022/049044—ISA/EPO—dated Feb. 28, 2023.

Nokia., et al., "MPE Impact on MRO", 3GPP TSG-RAN WG2 Meeting #113bis Electronic, R2-2103553, 3rd Generation Partnership Project (3GPP), Mobile Competence Centre, 650, Route Des Lucioles, F-06921 Sophia-Antipolis Cedex, France, vol. RAN WG2, No. Electronic, Apr. 12, 2021-Apr. 20, 2021, Apr. 1, 2021, 2 Pages, XP051992142, Chapter 2 Discussions.

* cited by examiner

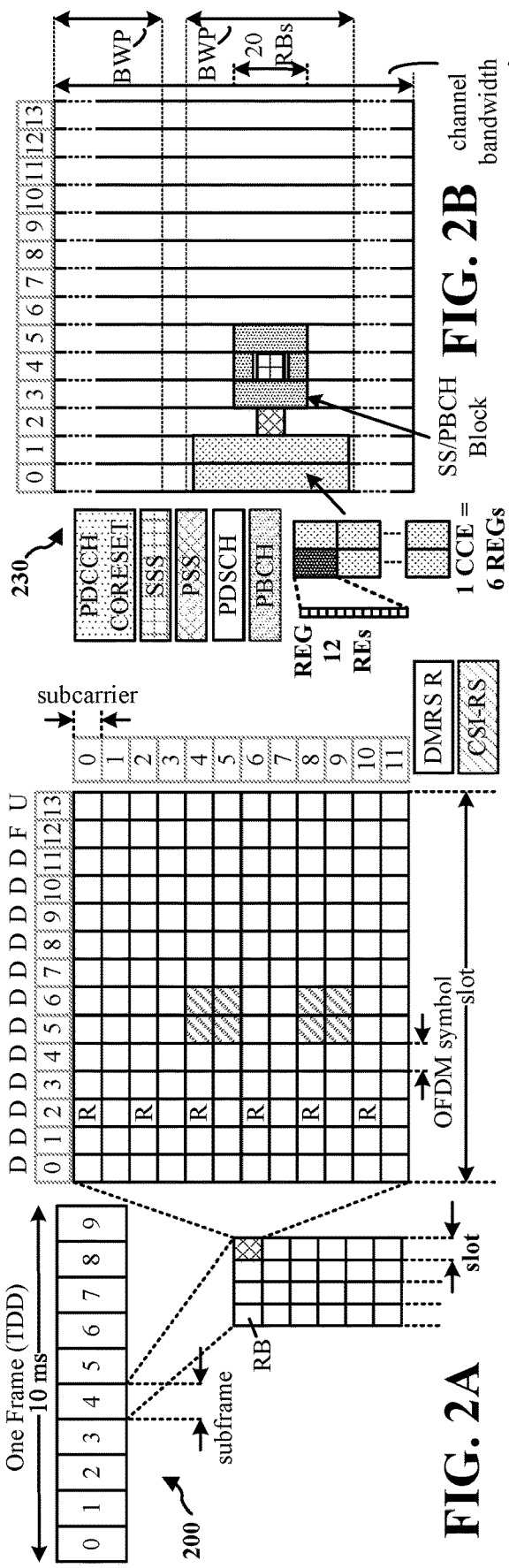
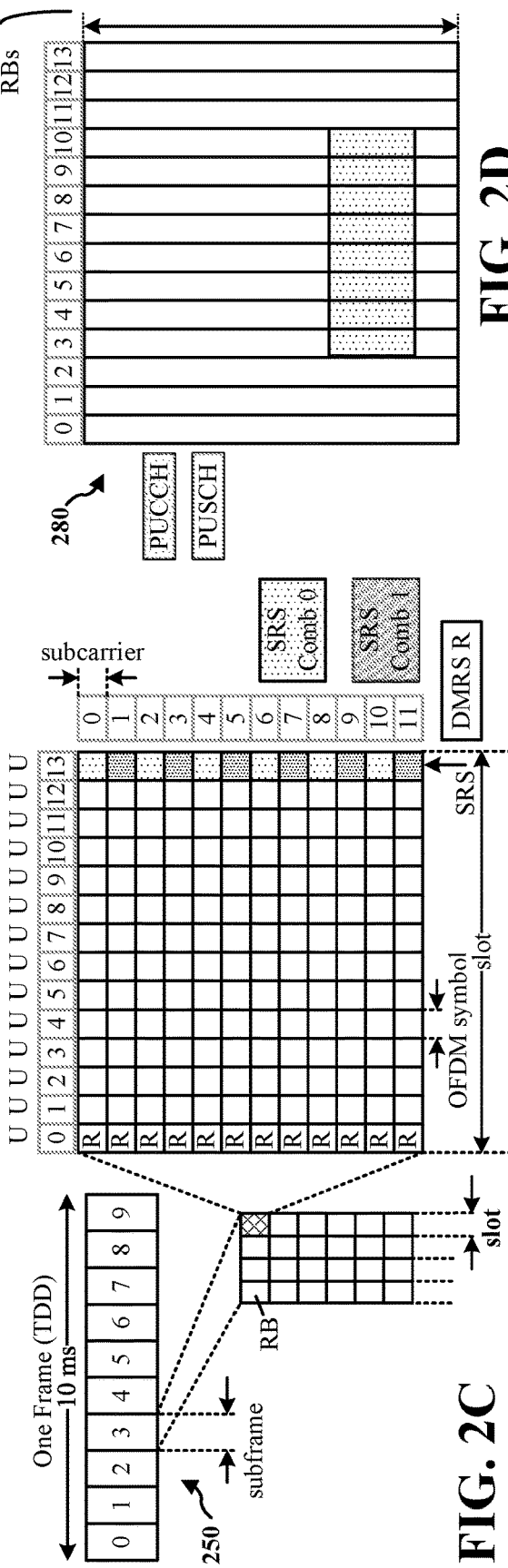
FIG. 2A
FIG. 2B
FIG. 2C
FIG. 2D

MOBILITY ENHANCEMENTS: CHO EXECUTION CONDITION

TECHNICAL FIELD

The present disclosure relates generally to communication systems, and more particularly, to wireless communication systems with conditional handover (CHO).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a first base station, a CHO configuration comprising one or more CHO candidate cell configurations associated with a second base station and one or more execution conditions associated with the first base station and including one or more CHO measurements, the one or more CHO measurements comprising one or more layer 1 (L1) beam or cell specific measurements or one or more layer 3 (L3) beam specific measurements. The memory and the at least one processor coupled to the memory may be further configured to detach from a first cell associated with the first base station and synchronize with a second cell associated with the second base station based on the one or more CHO measurements satisfying the one or more execution conditions, the second cell being one cell associated with the one or more CHO candidate cell configurations.

In another aspect of the disclosure, a method, a computer-readable medium, and an apparatus at a base station are provided. The apparatus may include a memory and at least one processor coupled to the memory. The memory and the at least one processor coupled to the memory may be configured to receive, from a second base station, one or more CHO candidate cell configurations. The memory and the at least one processor coupled to the memory may be further configured to transmit, to a UE, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
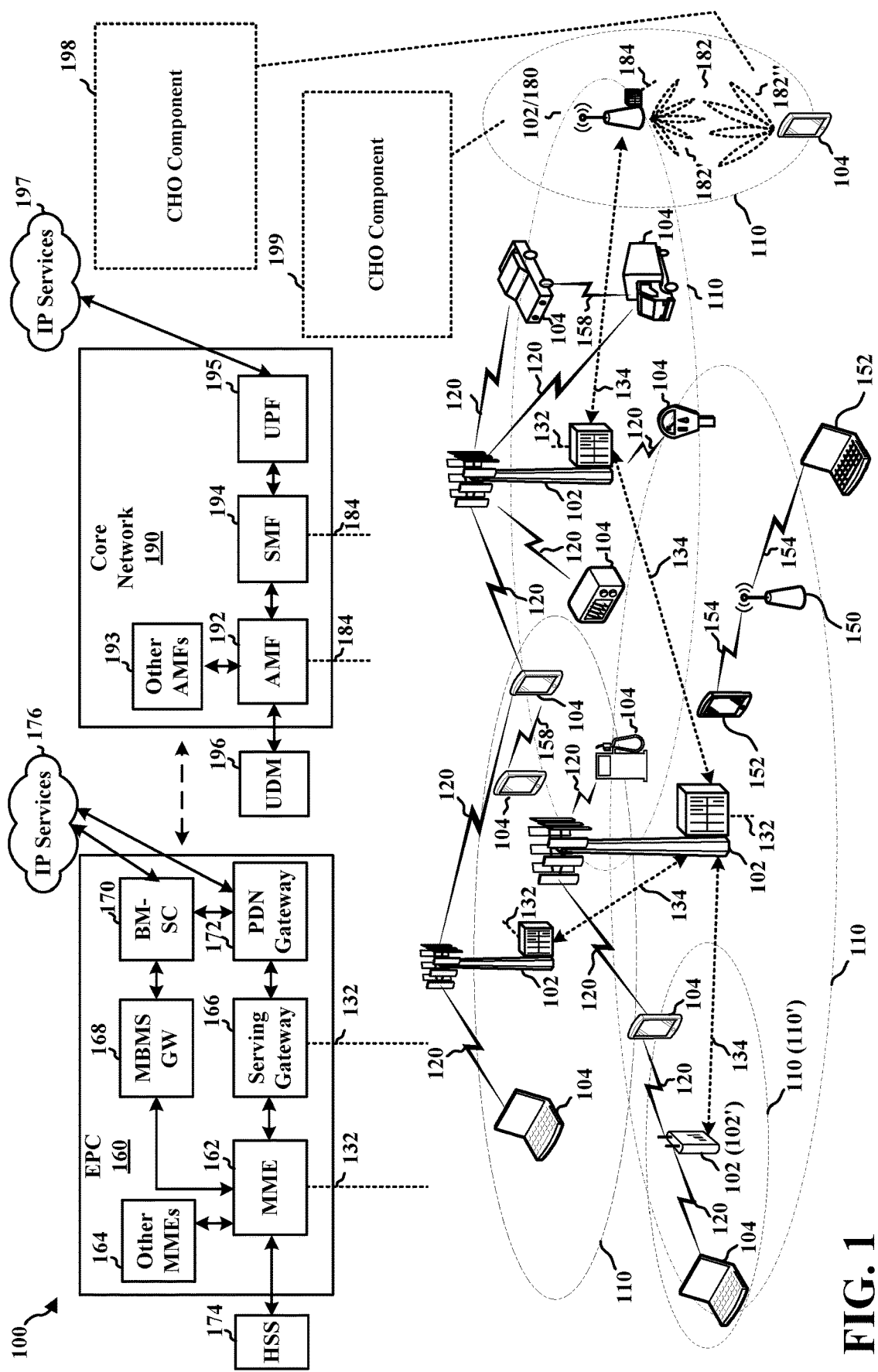
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a CHO component 198. In some aspects, the CHO component 198 may be configured to receive, from a first base station, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements. In some aspects, the CHO component 198 may be further configured to detach from a first cell associated with the first base station and synchronize with a second cell associated with the second base station based on the one or more CHO measurements satisfying the one or more execution conditions, the second cell being one cell associated with the one or more CHO candidate cell configurations.

In certain aspects, the base station 180 may include a CHO component 199. In some aspects, the CHO component 199 may be configured to receive, from a second base station, one or more CHO candidate cell configurations. In some aspects, the CHO component 199 may be further configured to transmit, to a UE, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame.

The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
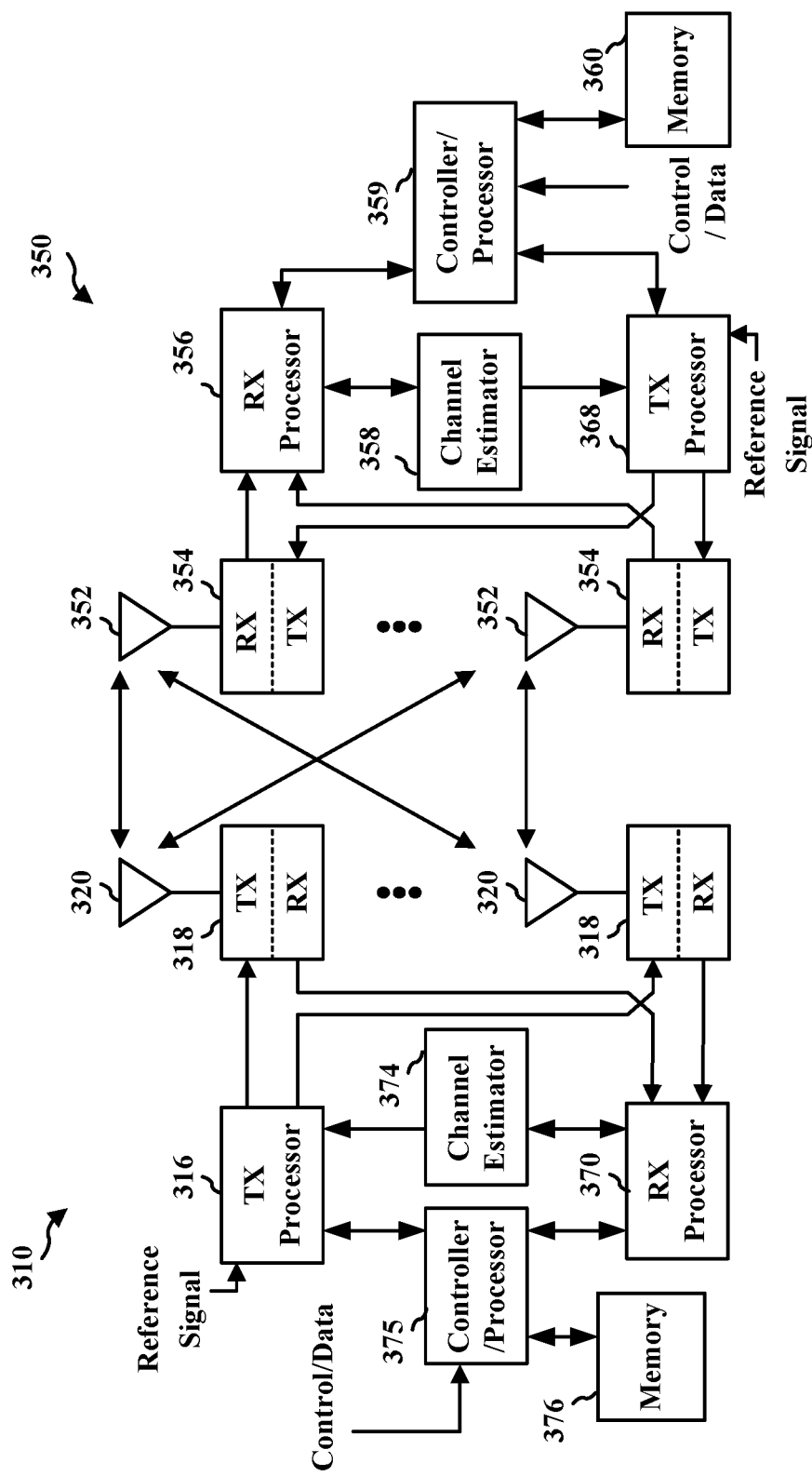
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with CHO component 198 of FIG. 1.

At least one of the TX processor 316, the RX processor 370, and the controller/processor 375 may be configured to perform aspects in connection with CHO component 199 of FIG. 1.

A UE may perform measurements of one or more signals, such as a reference signal, from a base station as part of monitoring a connection with the base station. In some wireless communication systems, when a UE is active, the UE may transmit a measurement report if the link to the serving cell of the UE is becoming degraded or if the UE measures better measurements for another neighboring cell in the same frequency as the serving cell of the UE. Based on one or more measurement reports from the UE, the network may possibly transfer (which may be otherwise referred to as "handover") the UE's connection from the serving cell to the neighbor cell. As a result, the UE may experience better radio conditions and may exchange more accurate and efficient communication with the network.

In some wireless communication systems, a handover may be performed using a reconfiguration with a synchronization procedure. It may be possible that when the radio link becomes degraded between the UE and the base station, the UE transmits a measurement report. As the uplink link is degraded, the measurement report may never reach the network. It may also be possible that after the measurement report reaches the network, the downlink link may be degraded so that the UE fails to receive a response to the measurement report (such as a handover command) from the network. Therefore, radio link degradation may cause a handover procedure to fail, and the UE may lose the connection to the base station.

CHO may facilitate a more efficient handover procedure for a UE. Under a CHO procedure, the UE may receive a CHO configuration including CHO command and associated measurements (which may be also referred to as "measurement metrics" and may include thresholds associated with measurements) and associated conditions. The UE may store the CHO configuration without applying the handover procedure until one or more conditions are met. Upon detection of an occurrence of the conditions (e.g., by performing measurements and determining the measurements satisfy the conditions), the UE may initiate the handover procedure based on the previously received configuration. Example measurements may include cell coverage measurements represented by Radio Signal Received Power (RSRP), and quality represented by Radio Signal Received Quality (RSRQ), or other measurements that the UE performs on signals from the base station. In some wireless communication systems, L3 cell specific measurements may be utilized for CHO. Aspects provided herein provide for a CHO procedure that incorporates L1 beam or cell specific measurements and/or L3 beam specific measurements in the CHO procedure. Aspects presented herein provide for signaling between the UE and base stations and operations at the UE in accordance with the example aspects based on L1 beam or cell specific measurements and/or L3 beam specific measurements performed by the UE.

Figure 4:
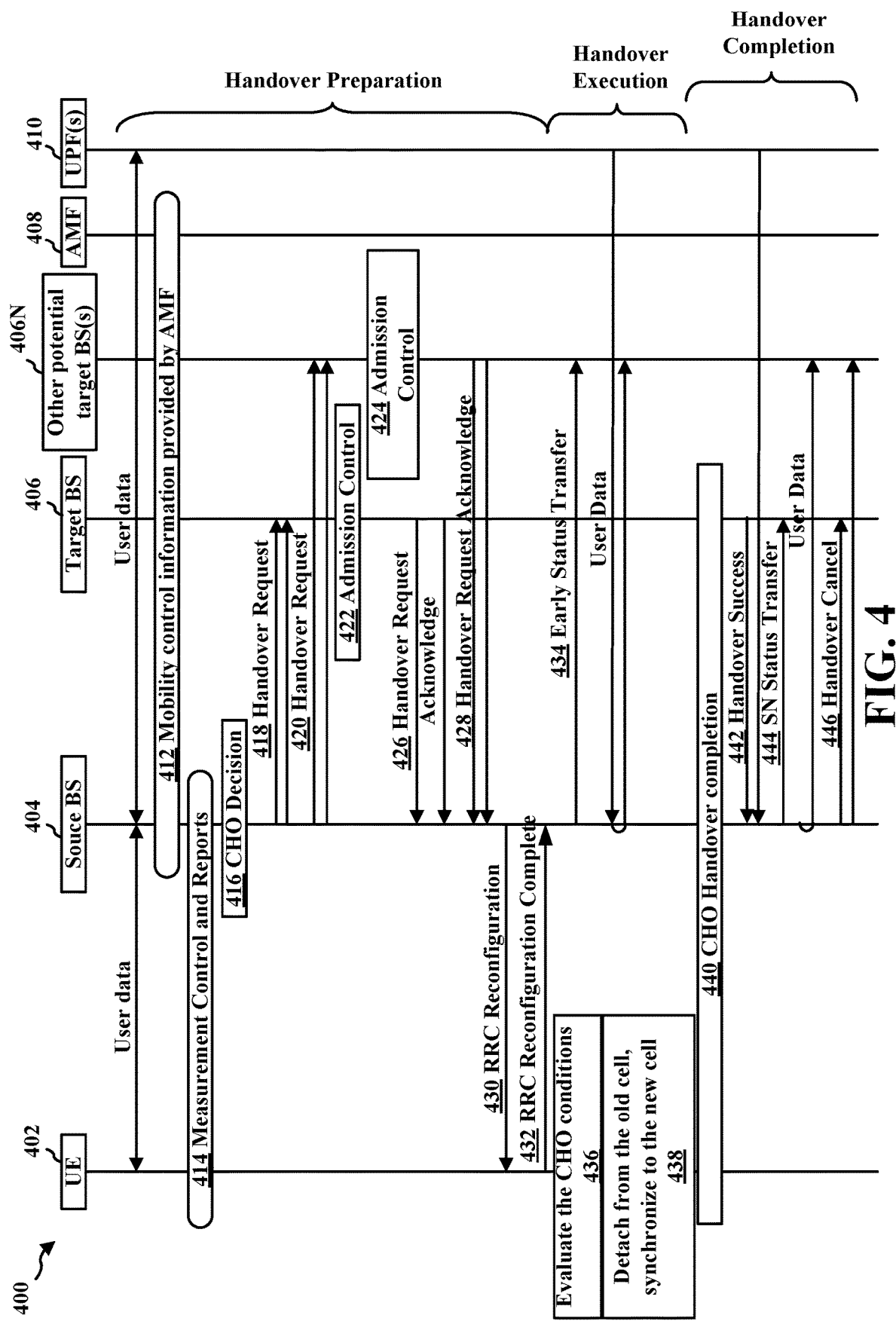
FIG. 4 is a diagram illustrating example communications between a UE, a source base station, one or more target base stations, an access and mobility function (AMF), and a user plane function (UPF) for CHO.

FIG. 4 is a diagram 400 illustrating example communication flow between a UE 402, a source base station 404, one or more target base stations 406, an AMF 408, and a UPF 410 for CHO based on L1 beam or cell specific measurements and/or L3 beam specific measurements performed by the UE.

The AMF 408 may receive connection and session related information originated from a UE and may be responsible for handling connection and mobility management tasks. The AMF 408 may also be responsible for managing handovers between base stations. As previously explained, a handover include changing a serving base station for a UE from a source base station to a target base station. The UPF 410 may provide an interconnect point between the mobile infrastructure and the Data Network (DN) and may be perform encapsulation and decapsulation of GPRS Tunneling Protocol for the user plane (GTP-U).

The UPF 410 may also provide a PDU session anchor point for providing mobility within and between Radio Access Technologies (RATs), including sending one or more end marker packets to the base station. The UPF 410 may also perform packet routing and forwarding, including performing the role of an Uplink Classifier/UL-CL (directing flows to specific data networks based on traffic matching filters), application detection using Service Data Flow (SDF) traffic filter templates or 3-tuple (protocol, server-side IP address and port number) packet flow description (PFD), per-flow quality of service (QoS) handling, and traffic usage reporting.

As illustrated in FIG. 4, user data may be exchanged between UE 402, the source base station 404 (e.g., a current serving base station for the UE 402), and the UPF 410. The AMF 408 may provide mobility control information 412 to the source base station 404. The mobility control information 412 may include, by way of example, PRACH configurations, radio resource configurations in system information, spectrum emission, carrier frequency, absolute radio-frequency channel number (ARFCN), band class, band indicator, or other information. The UE 402 and the base station 404 may exchange measurement control and reports 414 including one or more L1 or L3 beam specific or cell specific measurements. Based on the measurement control and reports 414, the base station 404 may decide on a CHO decision 416 for the UE 402. For example, the base station 404 may determine that a radio link between the UE 402 and the base station 404 may be potentially degrading—but not degraded to an extent that an immediate handover may be performed at the moment.

Based on the CHO decision 416, the base station 404 (which may be the source base station and a current serving base station for the UE 402) may transmit a handover request 418 for handing over the UE 402 to the target base station 406. The base station 404 may also transmit a handover request 420 for handing over the UE 402 to one or more other target base stations 406N. Upon receiving the handover request 418, the target base station 406 may perform admission control at 422. Similarly, upon receiving the handover request 420, the one or more target base stations 406N may perform admission control at 424. As part of the admission control at 422 or 424, the base station(s) may determine priorities associated with different traffic from different UEs and manage resources accordingly.

After performing the admission control at 422 or 424, the target base station 406 or the one or more target base stations 406N may transmit a handover request acknowledge 426 or a handover request acknowledge 428 to the base station 404. In some aspects, the handover request acknowledge 426 or the handover request acknowledge 428 may also be referred to as a "CHO response" and may include one or more configurations of one or more CHO candidate cell(s) generated by the target base station 406 or the one or more target base stations 406N. Upon receiving the handover request acknowledge 426 or the handover request acknowledge 428, the base station 404 may generate a CHO configuration including the configuration of CHO candidate cell(s) generated by the target base station 406 or the one or more target base stations 406N and further including one or more execution conditions associated with the CHO (generated by the base station 404). The base station may transmit the CHO configuration via the RRC reconfiguration 430 to the UE 402. In some aspects, CHO configuration of candidate cells may be followed by another reconfiguration from the base station 404. The base station 404 may also transmit early status transfer 434 to the target base station 406 or the one or more target base stations 406N.

Upon receiving the RRC reconfiguration 430, the UE 402 may transmit a RRC reconfiguration complete 432 to acknowledge receipt of the RRC reconfiguration 430. The UE may evaluate one or more execution conditions at 436 (the one or more execution conditions may be included in the CHO reconfiguration associated with the RRC reconfiguration 430). Upon determining the one or more execution conditions are satisfied, the UE 402 may select a new cell among the candidate cells indicated in the CHO configuration associated with the RRC reconfiguration 430, and the UE 402 may detach from a current cell associated with the base station 404 and synchronize with a new cell associated with the target base station 406 or the one or more target base stations 406N at 438.

After synchronizing with the new cell, the UE 402, the base station 404, or the target base station 406 or the one or more target base stations 406N may determine CHO completion at 440. The UPF 410 may accordingly transmit a handover success 442 indicating the success handover to the source base station 404. The base station 404 may transmit a sequence number (SN) status transfer 444 and associated user data of the UE 402 to the target base station 406 or the one or more target base stations 406N. The SN status transfer 444 may include the uplink PDCP SN and Hyper Frame Number (HFN) receiver status and the downlink PDCP SN and HFN transmitter status. In some aspects, the base station 404 may cancel the handover by transmitting a handover cancel 446 to the target base station 406 or the one or more target base stations 406N.

In some aspects, the base station 404 may configure a secondary cell group (SCG) cells that may include a primary secondary cell (PSCell) and one or more secondary cells (SCells) in a CHO command associated with the RRC reconfiguration 430.

In some aspects, the SCG cells may be selected based on measurements received in CHO Request which might be outdated at CHO execution. In some aspects, the execution conditions may be based on L1 beam specific measurements, L3 beam specific measurements, L1 cell specific measurements, L3 cell specific measurements, or the like. In some aspect, the CHO may allow carrier aggregation (CA) configuration at the target base station 406, or the one or more target base stations 406N. The execution conditions may be based on primary cell or primary cell and secondary cells.

In some aspects, beam measurements and CHO execution conditions based on the beam measurements may be enabled. In some aspects, regular handover measurement objects may be based on L3 measurements that can be beam-based and may be also applied to CHO. In some aspects, L1 beam-specific measurements and CHO execution conditions based on regular handover measurements may be further enabled. As an example, in addition to or alternative to L1 beam measurements of a serving cell being used for beam management, the L1 beam measurements of a non-serving cell, e.g., a target cell, may be used for the CHO. In some aspects, the L1 beam specific measurements, L3 beam specific measurements, L1 cell specific measurements, L3 cell specific measurements, or the like may include intra-frequency and inter-frequency measurements. In some aspects, the L1 measurements may include one or more of an RSRP, an RSRQ, an Received signal strength indicator (RSSI), or a signal to noise and interference ratio (SINR) measurement of various signals, such as a SSB, a PSS, a SSS, a broadcast channel (BCH), a DM-RS, CSI-RS, or the like. In some aspects, the L3 measurements may include a longer view of channel conditions that L1 measurements, whereas L1 measurements may be collected more frequently than L3 measurements. In some aspects, L1 measurements may be included in a CSI report. In some aspects, L3 measurements may be based on RSRP, RSRQ, RSSI, and/or SINR measurements of various signals, such as SSB, PSS, SSS, BCH, DM-RS, and/or CSI-RS, and may include filtering or other processing, e.g., to remove fading effects or shorter term variations that might be included in the L1 measurements. In some aspects, L1 beam specific or L3 beam specific measurements may be measured based on the various signals on a specific beam. In some aspects, L1 cell specific or L3 cell specific measurements may be measured based on the various signals on a specific cell, such as a primary cell or a secondary cell.

In some aspects, L3 measurements may be used for radio resource management decisions that may be based on a longer period of time compared with L1 measurements. In some aspects, beam specific L3 measurements may be generated by filtering beam specific L1 measurements at L3 based on filter coefficients, such as RSRP filter coefficient or RSRQ filter coefficient. For example, the UE may perform linear filter and apply the filter coefficients to the L3 measurements. In some aspects, the filter coefficients may be applied based on the formula: $F_N=(1-a)F_{n-1}+a\ M_n$. The parameter $F_N$ may represent a filtered measurement that may be used. The parameter $F_{n-1}$ may represent a original measurement result before the filtering is applied. The parameter $M_n$ may represent a latest received measurement result from a PHY layer. The parameter a may represent the filter coefficient. Filtering may be performed to remove fast fading and reduce the effect of short term variations. In some aspects, L3 measurements may be based on a larger configured periodicity compared with L3 measurements.

In some aspects, cell specific L3 measurements may be derived from cell specific L3 measurements based on one or more rules and filtering may be applied. In some aspects, a quantity configuration cell parameter may represent L3 filtering for cell measurement results for one or more configurable signal types (such as SSB and CSI-RS). L3 cell specific measurement results may be based on filtering L1 cell specific measurements results using a quantity configuration cell parameter.

In some aspects, the one or more execution conditions may be based on L1/L3 (beam or cell-specific) measurements such as best beam quality (e.g., a beam quality for the neighbor cell being above a threshold or the beam quality for the neighbor cell being better than the current serving cell beam), a best N beams quality (e.g., having at least N beams above a threshold or better than current cell beams), or a combination of one or more L1/L3 measurements. For example, an execution condition may be defined based on L1 measurement of best N beams and L3 measurement of cell-based measurement. In some aspects, the one or more execution conditions and associated thresholds may be included in the CHO configuration associated with the RRC reconfiguration 430.

In some aspects, the one or more execution conditions may further include reception of M measurements (M being a positive integer) indicating that a threshold/condition is reached. For example, the execution conditions may include receiving that the best N beam quality is above certain threshold is detected consecutively or within a certain time window (e.g., a defined timer). In some aspects, slope(s) associated with cell channel measurements, beam-specific or cell specific, may be also the part of the execution condition. The slope may represent a rate of change. As one example, if the slope is beyond a configured threshold and channel quality is also above a threshold, the execution condition may be determined to be satisfied and CHO may be executed accordingly. In some aspects, the one or more execution conditions may be further based on beam-specific or cell specific prediction of the channel conditions. For example, the one or more execution conditions may be further based on predictions based on the channel quality, slope of the channel quality, or number of beams being above a threshold. As one example, the one or more execution conditions may be based on machine learning techniques that generate the predictions and associated threshold based on the channel quality, slope of the channel quality, or number of beams. The predictions and associated threshold may be indicated by the base station 404 or generated by the UE 402. In some aspects, the UE 402 may further determine one or more candidate cells based on a maximum permissible exposure (MPE). In some aspects, if the UE 402 determines there is unsuitable MPE for one or more UL beams even though the DL measurement may be satisfying (e.g., or best) based on one or more criteria, the UE 402 may choose a different candidate cell.

In some aspects, the CHO command may include one or more L1 or L2 mobility information, such as list of cells that belong to the cell set for L1/L2 mobility and their RRC configuration. In some aspects, the cells for L1/L2 mobility may belong to a same target base station (e.g., the base station 406). In some aspects, the cells for L1/L2 mobility may belong to the same serving DU or different serving DUs, and the same CU as the target cell (PCell/PSCell). In some aspects, the cells for L1/L2 mobility are selected based on measurements received at the source cell. In some aspects, to facilitate L3 handover and L1/L2 mobility, beam measurements may be enabled. In some aspects, measurements/reporting of the certain cells may be conditioned on the channel quality measured on the baseline measurement configuration. For example, the target base station 406 perform measurements on a set of cells of the base station 406 and extend measurements to additional cells of the base station 406 if a certain threshold is reached. In some aspects, the UE 402 may provide the base station 404 with a recommendation of the cells and beams to use for L1/L2 mobility. Based on the recommendation, the base station 404 may make a handover decision that considers the target PCell channel quality and the quality and the number of cells that may be used for L1/L2 mobility with the PCell.

Figure 5:
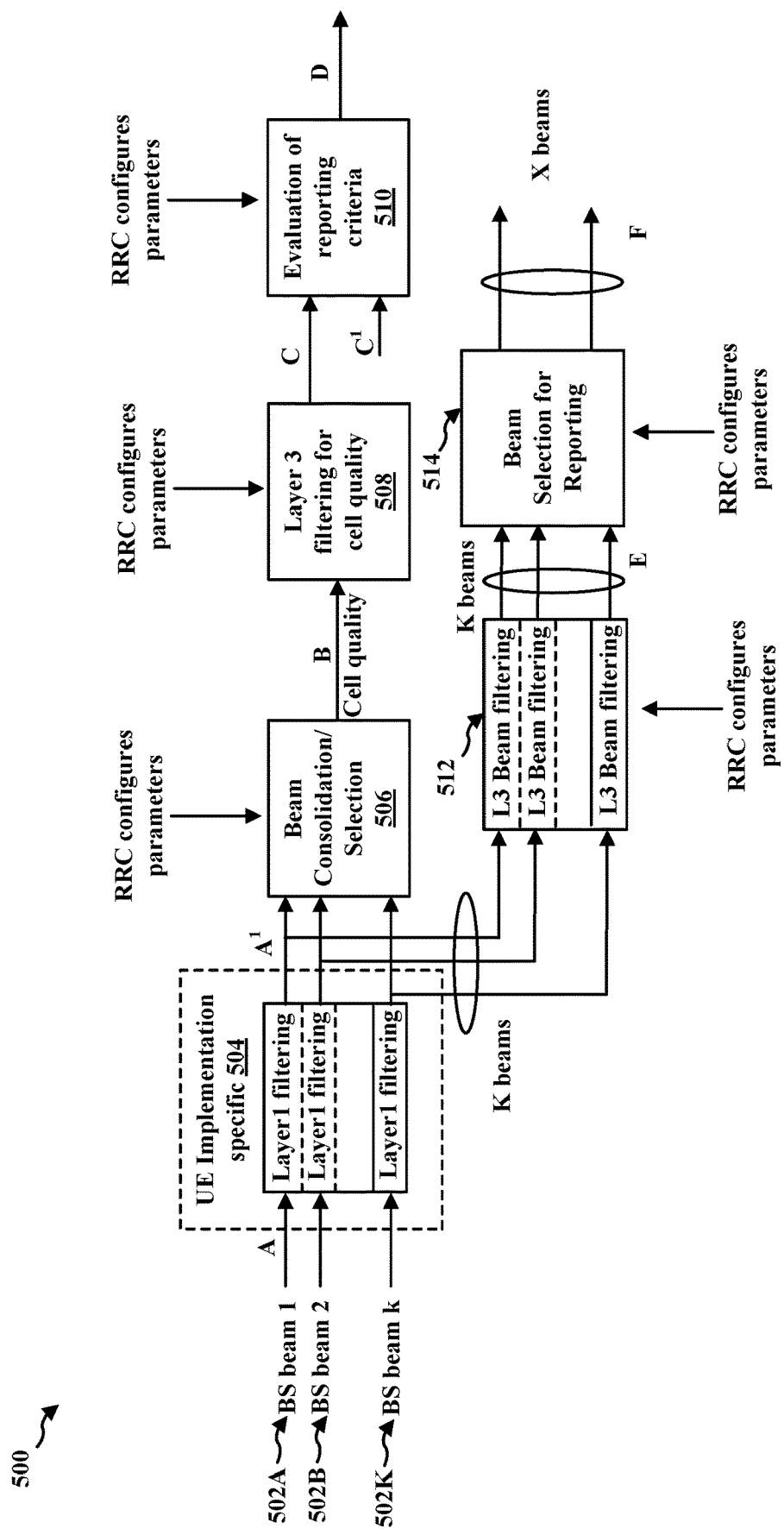
FIG. 5 is a diagram illustrating example operations for CHO.

FIG. 5 is a diagram 500 illustrating example operations for CHO. As illustrated in FIG. 5, one or more base station beams 502A, 502B, . . . , 502K may be present. The layer 1 filtering of each of the one or more base station beams 502A, 502B, . . . , 502K at 504 may be performed. Beam selection and consolidation may also be performed at 506, e.g., based on the beam information after the L1 filtering at 504. L3 cell filtering for cell quality may be additionally performed, at 508. An evaluation of reporting criteria may be additionally performed, at 510, and used by the UE to send a report to the base station. L3 beam filtering may also be performed, at 512, and associated beam selection for reporting may be performed, as illustrated at 514. The UE may then report the selected beams to a base station. As illustrated, the parameters for the various aspects of beam consolidation, L3 filtering for cell quality, evaluation of reporting criteria, L3 beam filtering, and/or beam selection for reporting may be configured, e.g., via one or more RRC messages.

Figure 6:
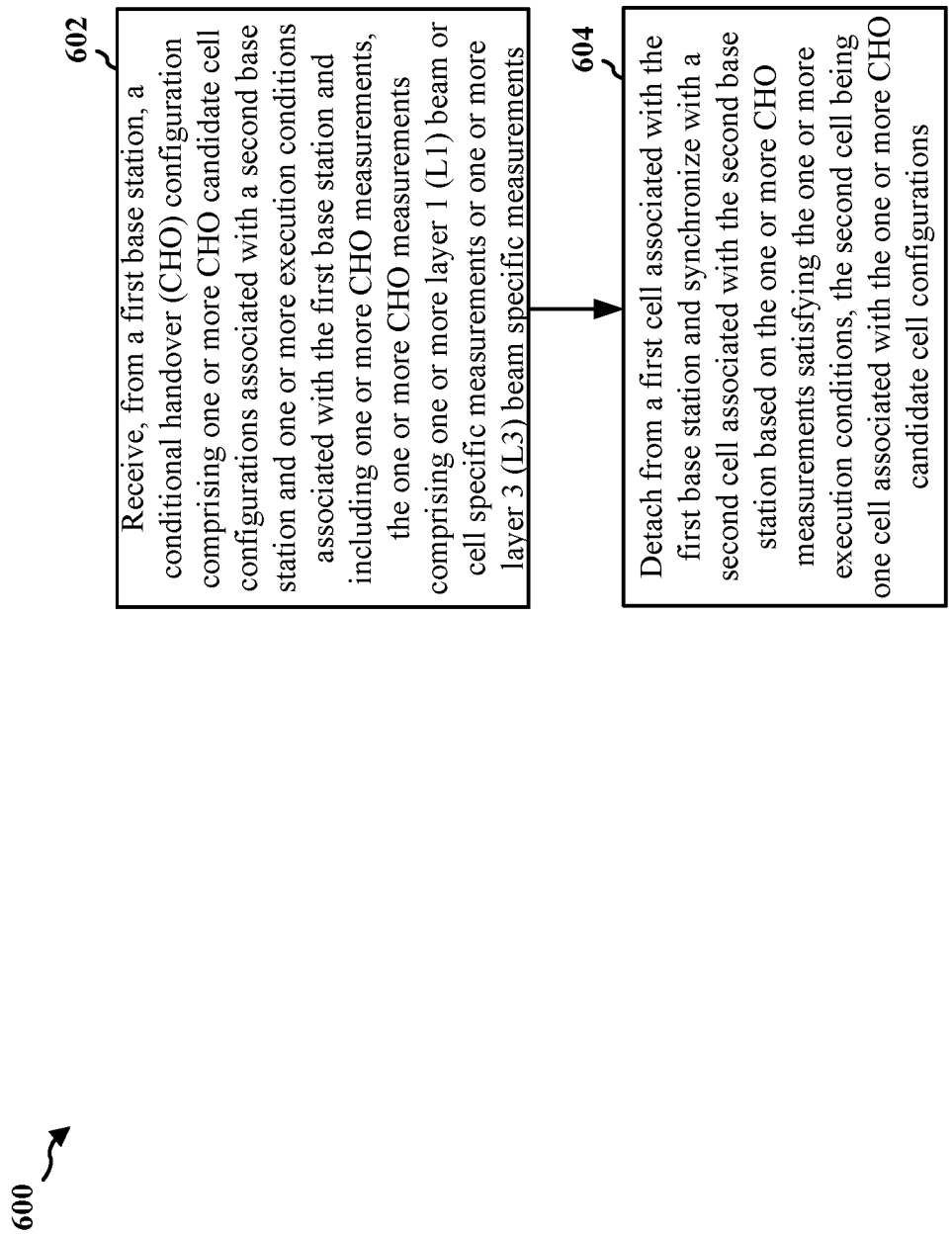
FIG. 6 is a flowchart of a method of wireless communication.

FIG. 6 is a flowchart 600 of a method of wireless communication. The method may be performed by a UE (e.g., the UE 104, the UE 402; the apparatus 802). The method may be used for enhancing CHO for a UE to allow more efficiently handing over a UE to a target base station, improving overall communication efficiency for the UE.

At 602, the UE may receive, from a first base station, a CHO configuration including one or more CHO candidate cell configurations associated with a second base station and one or more execution conditions associated with the first base station and including one or more CHO measurements. The one or more CHO measurements may include one or more L1 beam or cell specific measurements or one or more L3 beam specific measurements. Example aspects of L1 and L3 measurements are described in connection with FIGS. 4 and 5. For example, the UE 402 may receive, from a first base station 404, a CHO configuration (e.g., the measurement control and reports 414 and the RRC reconfiguration 430) including one or more CHO candidate cell configurations associated with a second base station 406 and one or more execution conditions associated with the first base station and including one or more CHO measurements. In some aspects, 602 may be performed by CHO component 842 in FIG. 8. In some aspects, the one or more CHO measurements may include a combination of the one or more L1 beam or cell specific measurements and the one or more L3 beam specific measurements. In some aspects, the one or more execution conditions may be based on a primary cell, e.g., the condition may relate to an L1 beam specific measurement and/or an L3 beam specific measurement of signal from the primary cell. In some aspects, the one or more execution conditions may be based on a primary cell and one or more secondary cells, e.g., the condition may relate to an L1 beam specific measurement and/or an L3 beam specific measurement of signal from the primary cell and/or a signal from the secondary cell(s). In some aspects, the one or more L1 beam or cell specific measurements may include inter-frequency measurements and intra-frequency measurements. In some aspects, the one or more L1 beam or cell specific measurements and the one or more L3 beam or cell specific measurements may be based on one or more SSBs, e.g., measurements of one or more SSBs in one or more beam directions. In some aspects, the one or more L1 beam or cell specific measurements and the one or more L3 beam or cell specific measurements may be based on one or more CSI-RSs, e.g., measurements of one or more CSI-RSs in one or more beam directions. In some aspects, the one or more execution conditions may be based on a beam quality of one or more beams. In some aspects, the one or more execution conditions may include a threshold number of beams having a beam measurement above a beam quality threshold. In some aspects, the one or more execution conditions may include a time window. In some aspects, the one or more execution conditions may include a slope associated with the one or more L1 beam or cell specific measurements and the one or more L3 beam or cell specific measurements. In some aspects, the one or more execution conditions may be further based on one or more predictions associated with a beam-specific channel condition or a cell-specific channel condition. In some aspects, the one or more execution conditions may be further based on a MPE.

At 604, the UE may detach from a first cell associated with the first base station and synchronize with a second cell associated with the second base station based on the one or more CHO measurements satisfying the one or more execution conditions. The second cell may be one cell associated with the one or more CHO candidate cell configurations. For example, the UE 402 may detach from a first cell associated with the first base station 404 and synchronize with a second cell associated with the second base station 406 based on the one or more CHO measurements satisfying the one or more execution conditions at 438. In some aspects, 602 may be performed by CHO component 842 in FIG. 8.

Figure 7:
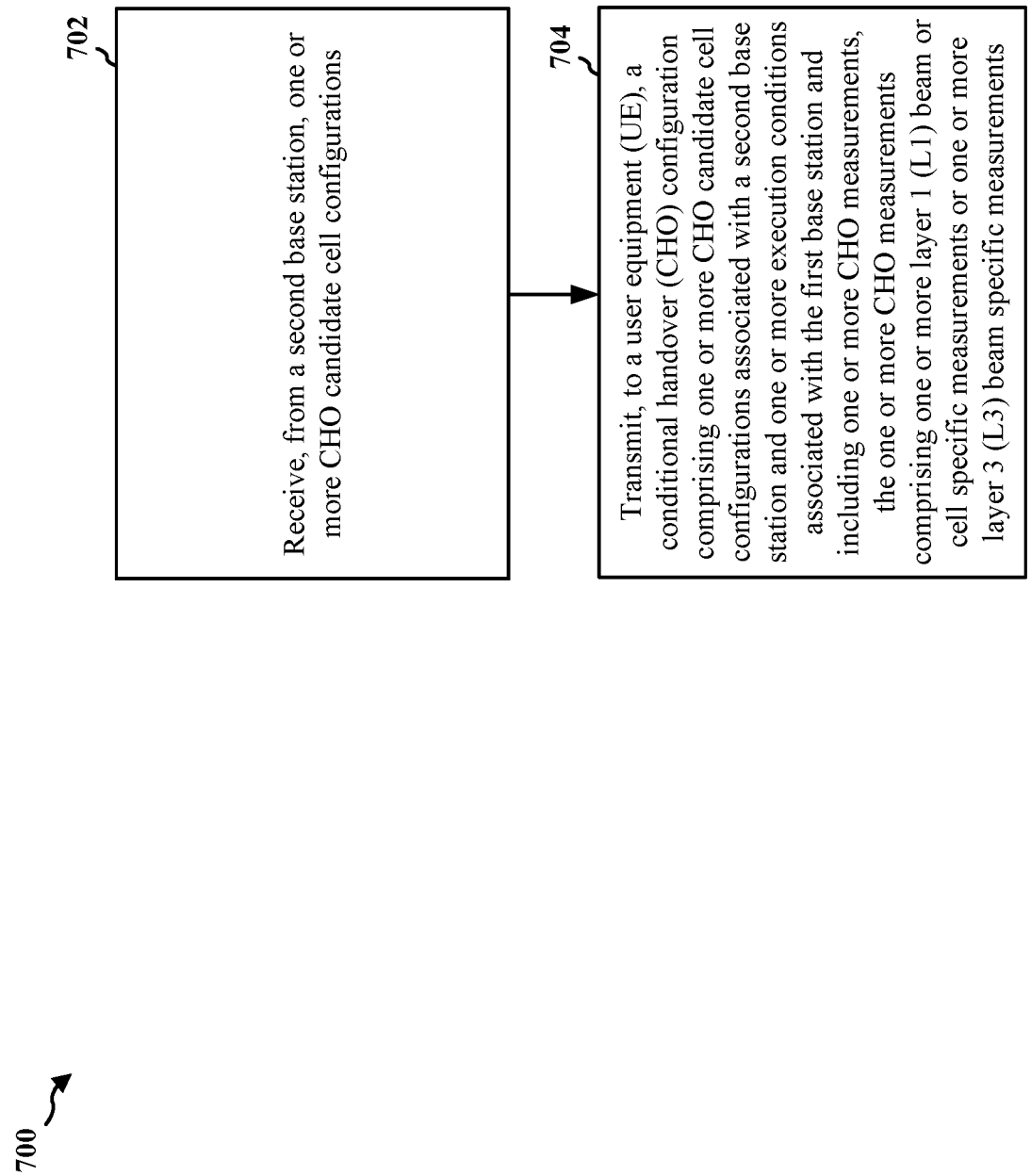
FIG. 7 is a flowchart of a method of wireless communication.

FIG. 7 is a flowchart 700 of a method of wireless communication. The method may be performed by a base station (e.g., the base station 102/180; the apparatus 902). The method may be used for enhancing CHO for a UE to allow more efficiently handing over a UE to a target base station, improving overall communication efficiency for the UE.

At 702, the base station may receive, from a second base station, one or more CHO candidate cell configurations. For example, the base station 404 may receive, from a second base station 406, one or more CHO candidate cell configurations (e.g., in handover request acknowledge 426 or 428). In some aspects, 702 may be performed by CHO component 942 in FIG. 9.

At 704, the base station may transmit, to a UE, a CHO configuration including one or more CHO candidate cell configurations associated with a second base station and one or more execution conditions associated with the first base station and including one or more CHO measurements. The one or more CHO measurements may include one or more L1 beam or cell specific measurements or one or more L3 beam specific measurements. Example aspects of L1 and L3 measurements are described in connection with FIGS. 4 and 5. For example, the base station 404 may transmit, to a UE 402, a CHO configuration (e.g., the measurement control and reports 414 and the RRC reconfiguration 430) including one or more CHO candidate cell configurations associated with a second base station and one or more execution conditions associated with the first base station and including one or more CHO measurements. In some aspects, 704 may be performed by CHO component 942 in FIG. 9. In some aspects, the one or more CHO measurements may include a combination of the one or more L1 beam or cell specific measurements and the one or more L3 beam specific measurements. In some aspects, the one or more execution conditions may be based on a primary cell, e.g., the condition may relate to an L1 beam specific measurement and/or an L3 beam specific measurement of signal from the primary cell. In some aspects, the one or more execution conditions may be based on a primary cell and one or more secondary cells, e.g., the condition may relate to an L1 beam specific measurement and/or an L3 beam specific measurement of signal from the primary cell and/or a signal from the secondary cell(s). In some aspects, the one or more L1 beam or cell specific measurements may include inter-frequency measurements and intra-frequency measurements. In some aspects, the one or more L1 beam or cell specific measurements and the one or more L3 beam or cell specific measurements may be based on one or more SSBs, e.g., measurements of one or more SSBs in one or more beam directions. In some aspects, the one or more L1 beam or cell specific measurements and the one or more L3 beam or cell specific measurements may be based on one or more CSI-RSs, e.g., measurements of one or more CSI-RSs in one or more beam directions. In some aspects, the one or more execution conditions may be based on a beam quality of one or more beams. In some aspects, the one or more execution conditions may include a threshold number of beams having a beam measurement above a beam quality threshold. In some aspects, the one or more execution conditions may include a time window. In some aspects, the one or more execution conditions may include a slope associated with the one or more L1 beam or cell specific measurements and the one or more L3 beam or cell specific measurements. In some aspects, the one or more execution conditions may be further based on one or more predictions associated with a beam-specific channel condition or a cell-specific channel condition. In some aspects, the one or more execution conditions may be further based on an MPE.

Figure 8:
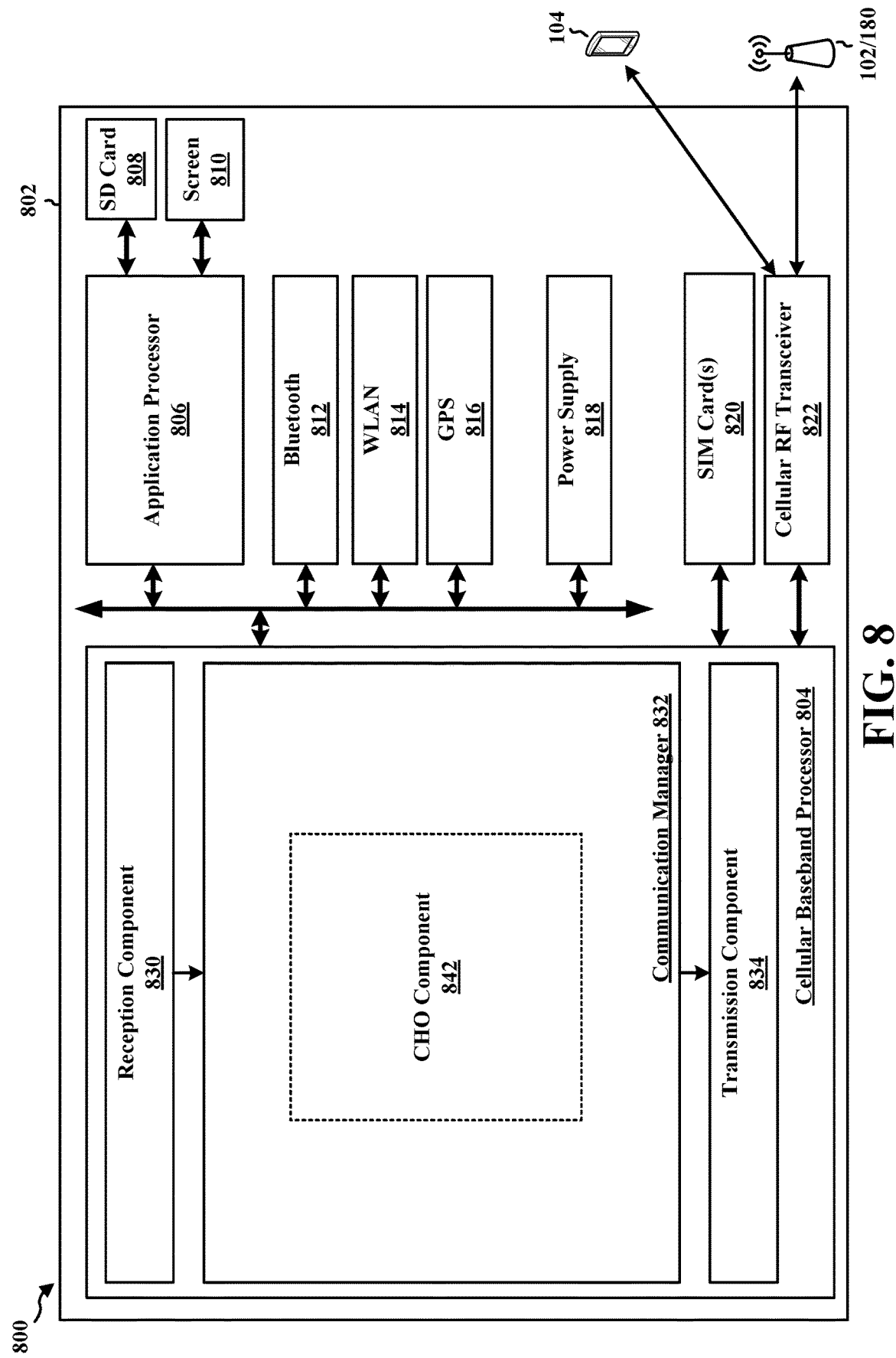
FIG. 8 is a diagram illustrating an example of a hardware implementation for an example apparatus.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 may include a CHO component 842 that is configured to receive, from a first base station, a CHO configuration comprising one or more CHO candidate cell configurations associated with a second base station and one or more execution conditions associated with the first base station and including one or more CHO measurements and detach from a first cell associated with the first base station and synchronize with a second cell associated with the second base station based on the one or more CHO measurements satisfying the one or more execution conditions, e.g., as described in connection with 602 and 604 in FIG. 6.

The apparatus may include additional components that perform each of the blocks of the algorithm in the flowchart of FIG. 6. As such, each block in the flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, may include means for receiving, from a first base station, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements. The cellular baseband processor 804 may further include means for detaching from a first cell associated with the first base station and synchronizing with a second cell associated with the second base station based on the one or more CHO measurements satisfying the one or more execution conditions, the second cell being one cell associated with the one or more CHO candidate cell configurations. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
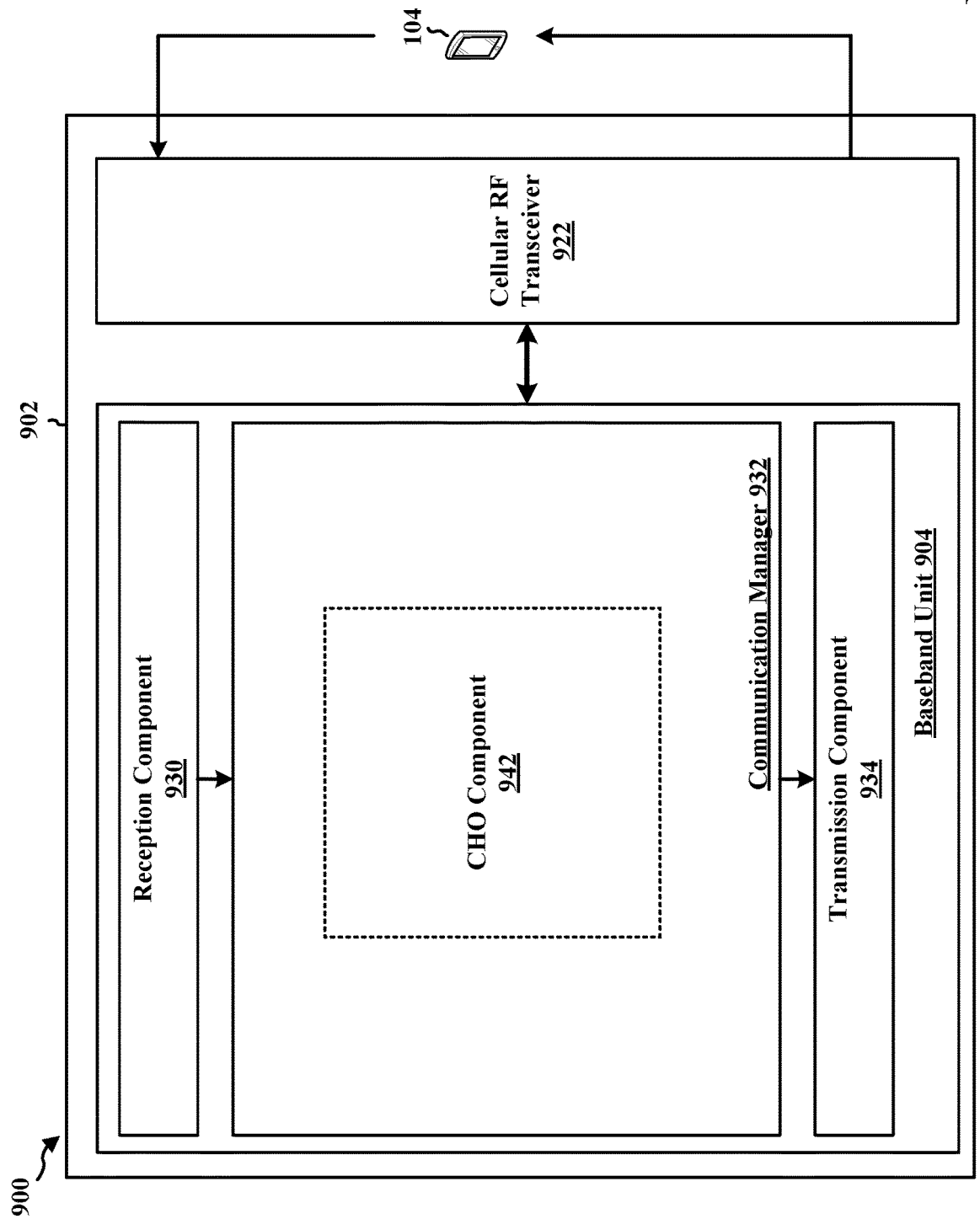
FIG. 9 is a diagram illustrating an example of a hardware implementation for an example apparatus.

FIG. 9 is a diagram 900 illustrating an example of a hardware implementation for an apparatus 902. The apparatus 902 may be a base station, a component of a base station, or may implement base station functionality. In some aspects, the apparatus 802 may include a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 may include a CHO component 942 that may receive, from a second base station, one or more CHO candidate cell configurations and transmit, to a UE, a CHO configuration comprising one or more CHO candidate cell configurations associated with a second base station and one or more execution conditions associated with the first base station and including one or more CHO measurements, e.g., as described in connection with 702 and 704 in FIG. 7.

The apparatus may include additional components that perform each of the blocks of the algorithm in the flowchart of FIG. 7. As such, each block in the flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband unit 904, may include means for receiving, from a second base station, one or more CHO candidate cell configurations. The baseband unit 904 may further include means for transmitting, to a UE, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements. The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a first base station, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements; and detach from a first cell associated with the first base station and synchronize with a second cell associated with the second base station based on the one or more CHO measurements satisfying the one or more execution conditions, the second cell being one cell associated with the one or more CHO candidate cell configurations.

Aspect 2 is the apparatus of aspect, wherein the one or more CHO measurements comprises a combination of the one or more L1 beam or cell specific measurements and the one or more L3 beam specific measurements.

Aspect 3 is the apparatus of any of aspects 1-2, wherein the one or more execution conditions are based on a primary cell.

Aspect 4 is the apparatus of any of aspects 1-3, wherein the one or more execution conditions are based on a primary cell and one or more secondary cells.

Aspect 5 is the apparatus of any of aspects 1-4, wherein the one or more L1 beam or cell specific measurements comprises inter-frequency measurements and intra-frequency measurements.

Aspect 6 is the apparatus of any of aspects 1-5, wherein the one or more L1 beam or cell specific measurements and the one or more L3 beam or cell specific measurements are based on one or more SSBs.

Aspect 7 is the apparatus of any of aspects 1-6, wherein the one or more L1 beam or cell specific measurements and the one or more L3 beam or cell specific measurements are based on one or more CSI-RSs.

Aspect 8 is the apparatus of any of aspects 1-7, wherein the one or more execution conditions is based on a beam quality of one or more beams.

Aspect 9 is the apparatus of any of aspects 1-8, wherein the one or more execution conditions comprises a threshold number of beams having a beam measurement above a beam quality threshold.

Aspect 10 is the apparatus of any of aspects 1-9, wherein the one or more execution conditions comprises a time window.

Aspect 11 is the apparatus of any of aspects 1-10, wherein the one or more execution conditions comprises a slope associated with the one or more L1 beam or cell specific measurements and the one or more L3 beam or cell specific measurements.

Aspect 12 is the apparatus of any of aspects 1-11, wherein the one or more execution conditions is further based on one or more predictions associated with a beam-specific channel condition or a cell-specific channel condition.

Aspect 13 is the apparatus of any of aspects 1-12, wherein the one or more execution conditions is further based on a MPE.

Aspect 14 is the apparatus of any of aspects 1-13, further comprising a transceiver coupled to the at least one processor.

Aspect 15 is an apparatus for wireless communication at a first base station, comprising: a memory; and at least one processor coupled to the memory and configured to: receive, from a second base station, one or more CHO candidate cell configurations; and transmit, to a UE, a CHO configuration comprising one or more CHO candidate cell configurations associated with a second base station and one or more execution conditions associated with the first base station and including one or more CHO measurements, the one or more CHO measurements comprising one or more L1 beam or cell specific measurements or one or more L3 beam specific measurements.

Aspect 16 is the apparatus of aspect 15, wherein the one or more CHO measurements comprises a combination of the one or more L1 beam or cell specific measurements and the one or more L3 beam specific measurements.

Aspect 17 is the apparatus of any of aspects 15-16, wherein the one or more execution conditions are based on a primary cell.

Aspect 18 is the apparatus of any of aspects 15-17, wherein the one or more execution conditions are based on a primary cell and one or more secondary cells.

Aspect 19 is the apparatus of any of aspects 15-18, wherein the one or more L1 beam or cell specific measurements comprises inter-frequency measurements and intra-frequency measurements.

Aspect 20 is the apparatus of any of aspects 15-19, wherein the one or more L1 beam or cell specific measurements and the one or more L3 beam or cell specific measurements are based on one or more SSBs.

Aspect 21 is the apparatus of any of aspects 15-20, wherein the one or more L1 beam or cell specific measurements and the one or more L3 beam or cell specific measurements are based on one or more CSI-RSs.

Aspect 22 is the apparatus of any of aspects 15-21, wherein the one or more execution conditions is based on a beam quality of one or more beams.

Aspect 23 is the apparatus of any of aspects 15-22, wherein the one or more execution conditions comprises a threshold number of beams having a beam measurement above a beam quality threshold.

Aspect 24 is the apparatus of any of aspects 15-23, wherein the one or more execution conditions comprises a time window.

Aspect 25 is the apparatus of any of aspects 15-24, wherein the one or more execution conditions comprises a slope associated with the one or more L1 beam or cell specific measurements and the one or more L3 beam or cell specific measurements.

Aspect 26 is the apparatus of any of aspects 15-15, wherein the one or more execution conditions is further based on one or more predictions associated with a beam-specific channel condition or a cell-specific channel condition.

Aspect 27 is the apparatus of any of aspects 15-26, wherein the one or more execution conditions is further based on a MPE.

Aspect 28 is the apparatus of any of aspects 15-27, further comprising a transceiver coupled to the at least one processor.

Aspect 29 is a method of wireless communication for implementing any of aspects 1 to 14.

Aspect 30 is an apparatus for wireless communication including means for implementing any of aspects 1 to 14.

Aspect 31 is a computer-readable medium storing computer executable code, where the code when executed by a processor causes the processor to implement any of aspects 1 to 14.

Aspect 32 is a method of wireless communication for implementing any of aspects 15 to 28.

Aspect 33 is an apparatus for wireless communication including means for implementing any of aspects 15 to 28.

Aspect 34 is a computer-readable medium storing computer executable code, where the code when executed by a processor causes the processor to implement any of aspects 15 to 28.

What is claimed is:

1. An apparatus for wireless communication at a user equipment (UE), comprising:
   a memory; and
   at least one processor coupled to the memory and configured to:
      receive, from a first base station, a conditional handover (CHO) configuration comprising one or more CHO candidate cell configurations associated with a second base station via a handover request acknowledge and one or more execution conditions associated with the first base station and including one or more CHO measurements, the one or more CHO measurements comprising one or more layer 1 (L1) beam or cell specific measurements or one or more layer 3 (L3) beam specific measurements, wherein the one or more execution conditions comprises a slope associated with the one or more L1 beam or cell specific measurements and the one or more L3 beam or cell specific measurements; and
      detach from a first cell associated with the first base station and synchronize with a second cell associated with the second base station based on the one or more CHO measurements satisfying the one or more execution conditions, the second cell being one cell associated with the one or more CHO candidate cell configurations.

2. The apparatus of claim 1, wherein the one or more CHO measurements comprises a combination of the one or more L1 beam or cell specific measurements and the one or more L3 beam specific measurements.

3. The apparatus of claim 1, wherein the one or more execution conditions are based on a primary cell.

4. The apparatus of claim 1, wherein the one or more execution conditions are based on a primary cell and one or more secondary cells.

5. The apparatus of claim 1, wherein the one or more L1 beam or cell specific measurements comprises inter-frequency measurements and intra-frequency measurements.

6. The apparatus of claim 1, wherein the one or more L1 beam or cell specific measurements and the one or more L3 beam or cell specific measurements are based on one or more synchronization signal blocks (SSBs).

7. The apparatus of claim 1, wherein the one or more L1 beam or cell specific measurements and the one or more L3 beam or cell specific measurements are based on one or more channel state information (CSI) reference signals (RSs) (CSI-RSs).

8. The apparatus of claim 1, wherein the one or more execution conditions is based on a beam quality of one or more beams.

9. The apparatus of claim 1, wherein the one or more execution conditions comprises a threshold number of beams having a beam measurement above a beam quality threshold.

10. The apparatus of claim 1, wherein the one or more execution conditions comprises a time window.

11. The apparatus of claim 1, wherein the one or more execution conditions is further based on one or more predictions associated with a beam-specific channel condition or a cell-specific channel condition.

12. The apparatus of claim 1, wherein the one or more execution conditions is further based on a maximum permissible exposure (MPE).

13. The apparatus of claim 1, further comprising a transceiver coupled to the at least one processor.

14. An apparatus for wireless communication at a first base station, comprising:
   a memory; and
   at least one processor coupled to the memory and configured to:
      receive, from a second base station, one or more CHO candidate cell configurations; and
      transmit, to a user equipment (UE), a conditional handover (CHO) configuration comprising the one or more CHO candidate cell configurations associated with the second base station via a handover request acknowledge and one or more execution conditions associated with the first base station and including one or more CHO measurements, the one or more CHO measurements comprising one or more layer 1 (L1) beam or cell specific measurements or one or more layer 3 (L3) beam specific measurements, wherein the one or more execution conditions comprises a slope associated with the one or more L1 beam or cell specific measurements and the one or more L3 beam or cell specific measurements.

15. The apparatus of claim 14, wherein the one or more CHO measurements comprises a combination of the one or more L1 beam or cell specific measurements and the one or more L3 beam specific measurements.

16. The apparatus of claim 14, wherein the one or more execution conditions are based on a primary cell.

17. The apparatus of claim 14, wherein the one or more execution conditions are based on a primary cell and one or more secondary cells.

18. The apparatus of claim 14, wherein the one or more L1 beam or cell specific measurements comprises inter-frequency measurements and intra-frequency measurements.

19. The apparatus of claim 14, wherein the one or more L1 beam or cell specific measurements and the one or more L3 beam or cell specific measurements are based on one or more synchronization signal blocks (SSBs).

20. The apparatus of claim 14, wherein the one or more L1 beam or cell specific measurements and the one or more L3 beam or cell specific measurements are based on one or more channel state information (CSI) reference signals (RSs) (CSI-RSs).

21. The apparatus of claim 14, wherein the one or more execution conditions is based on a beam quality of one or more beams.

22. The apparatus of claim 14, wherein the one or more execution conditions comprises a threshold number of beams having a beam measurement above a beam quality threshold.

23. The apparatus of claim 14, wherein the one or more execution conditions comprises a time window.

24. The apparatus of claim 14, wherein the one or more execution conditions is further based on one or more predictions associated with a beam-specific channel condition or a cell-specific channel condition.

25. The apparatus of claim 14, wherein the one or more execution conditions is further based on a maximum permissible exposure (MPE).

26. The apparatus of claim 14, further comprising a transceiver coupled to the at least one processor.

27. A method for wireless communication at a user equipment (UE), comprising:
receiving, from a first base station, a conditional handover (CHO) configuration comprising one or more CHO candidate cell configurations associated with a second base station via a handover request acknowledge and one or more execution conditions associated with the first base station and including one or more CHO measurements, the one or more CHO measurements comprising one or more layer 1 (L1) beam or cell specific measurements or one or more layer 3 (L3) beam specific measurements, wherein the one or more execution conditions comprises a slope associated with the one or more L1 beam or cell specific measurements and the one or more L3 beam or cell specific measurements; and
detaching from a first cell associated with the first base station and synchronizing with a second cell associated with the second base station based on the one or more CHO measurements satisfying the one or more execution conditions, the second cell being one cell associated with the one or more CHO candidate cell configurations.

28. A method for wireless communication at a first base station, comprising:
receiving, from a second base station, one or more CHO candidate cell configurations; and
transmitting, to a user equipment (UE), a conditional handover (CHO) configuration comprising the one or more CHO candidate cell configurations associated with the second base station via a handover request acknowledge and one or more execution conditions associated with the first base station and including one or more CHO measurements, the one or more CHO measurements comprising one or more layer 1 (L1) beam or cell specific measurements or one or more layer 3 (L3) beam specific measurements, wherein the one or more execution conditions comprises a slope associated with the one or more L1 beam or cell specific measurements and the one or more L3 beam or cell specific measurements.

* * * * *